US012679041B2

(12) United States Patent
Endo

(10) Patent No.: US 12,679,041 B2
(45) Date of Patent: Jul. 14, 2026

(54) MANUFACTURING METHOD OF HOUSING AND APPARATUS HAVING THE SAME

(71) Applicant: CANON KABUSHIKI KAISHA, Tokyo (JP)

(72) Inventor: Takuma Endo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 18/627,525

(22) Filed: Apr. 5, 2024

(65) Prior Publication Data

US 2024/0342997 A1     Oct. 17, 2024

(30) Foreign Application Priority Data

Apr. 17, 2023     (JP) ................................. 2023-067104

(51) Int. Cl.
  *B29C 65/08*          (2006.01)
  *B29L 31/36*          (2006.01)
(52) U.S. Cl.
  CPC ........... *B29C 65/08* (2013.01); *B29L 2031/36* (2013.01)
(58) Field of Classification Search
  CPC .............. B29C 65/08; B29C 66/30223; B29C 66/1142; B29C 66/1222; B29C 66/1224; B29C 66/40; B29C 66/54; B29L 2031/36

USPC ........................................................ 156/73.1
See application file for complete search history.

(56) References Cited

FOREIGN PATENT DOCUMENTS

EP          3527355 A1 *  8/2019  ............. B29C 66/54
JP     2010023272 A     2/2010

* cited by examiner

*Primary Examiner* — James D Sells
(74) *Attorney, Agent, or Firm* — Cowan, Liebowitz & Latman, P.C.

(57)          ABSTRACT

A manufacturing method of a housing that includes a first case having a first surface, a second case having a second surface opposite to the first surface, and ribs provided between the first case and the second case includes disposing the ribs on the first surface, and joining the first case and the second case together by melting the ribs. In the disposing, in a case where a load in a first direction orthogonal to an applied surface including a joined surface between the first case and the second case is applied to the applied surface, a volume of each rib is set so that maximum values of stresses generated in a plurality of regions having the same area of the ribs fall within in a range from a value of 80% of a yield stress value of a material of the ribs to the yield stress value.

15 Claims, 5 Drawing Sheets

100

171 (WHOLE CIRCUMFERENCE)
172
170
102
101
184
182
183
180
181 (WHOLE CIRCUMFERENCE)

171 (WHOLE
CIRCUMFERENCE)

172

170

LOAD APPLIED POSITION (1)
(SIDE-SURFACE CENTRAL PORTION)

LOAD APPLIED
POSITION (3)

FIRST CASE 170 IN FIG.2

Z

Y

X

SECOND CASE 180

LOAD APPLIED
POSITION (2)

LOAD APPLYING DIRECTION:
+Y DIRECTION (DIRECTION PERPENDICULAR TO SIDE SURFACE)

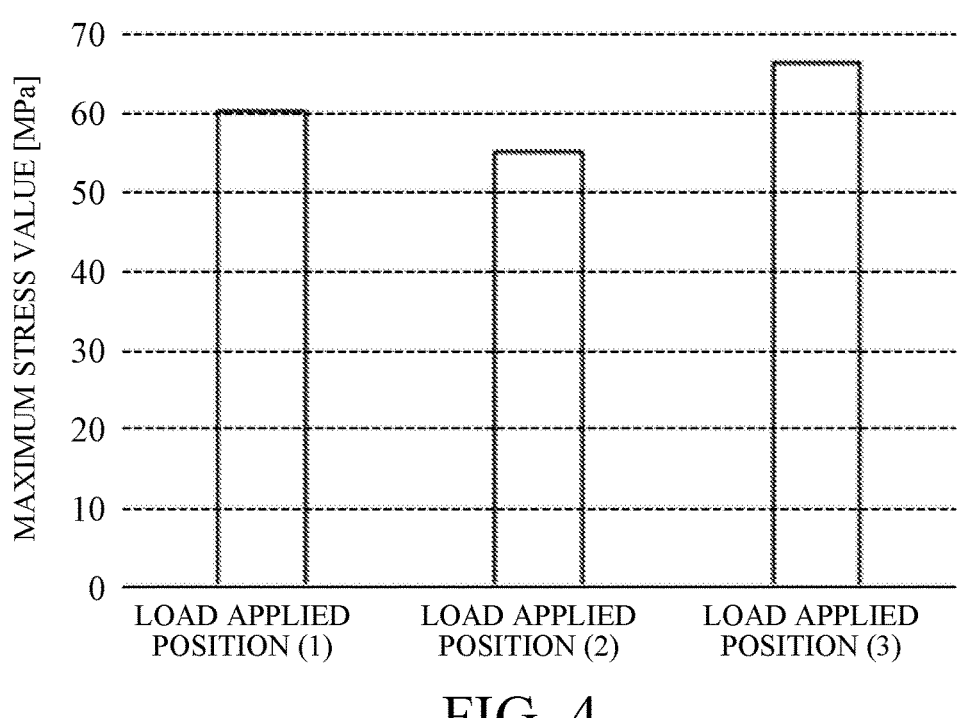
FIG. 4
INTERIOR ANGLE
FORMING FIRST SLOPE
INTERIOR ANGLE
FORMING SECOND ANGLE
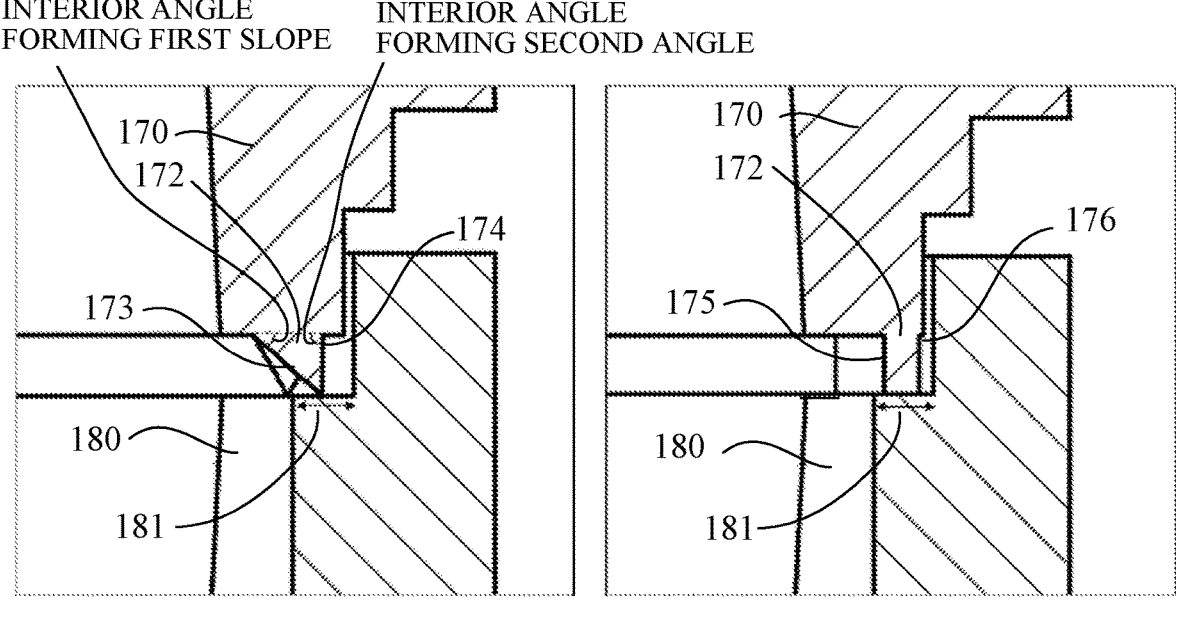
FIG. 5A                    FIG. 5B

PRIOR ART 171 (WHOLE CIRCUMFERENCE)

172

LOAD APPLIED POSITION (1)
(SIDE-SURFACE CENTRAL PORTION)

LOAD APPLIED POSITION (3)

FIRST CASE 170 IN FIG. 6

Z

Y

X

LOAD APPLIED POSITION (2)

SECOND CASE 180

LOAD APPLYING DIRECTION :
+Y DIRECTION (DIRECTION PERPENDICULAR TO SIDE SURFACE)

PRIOR ART
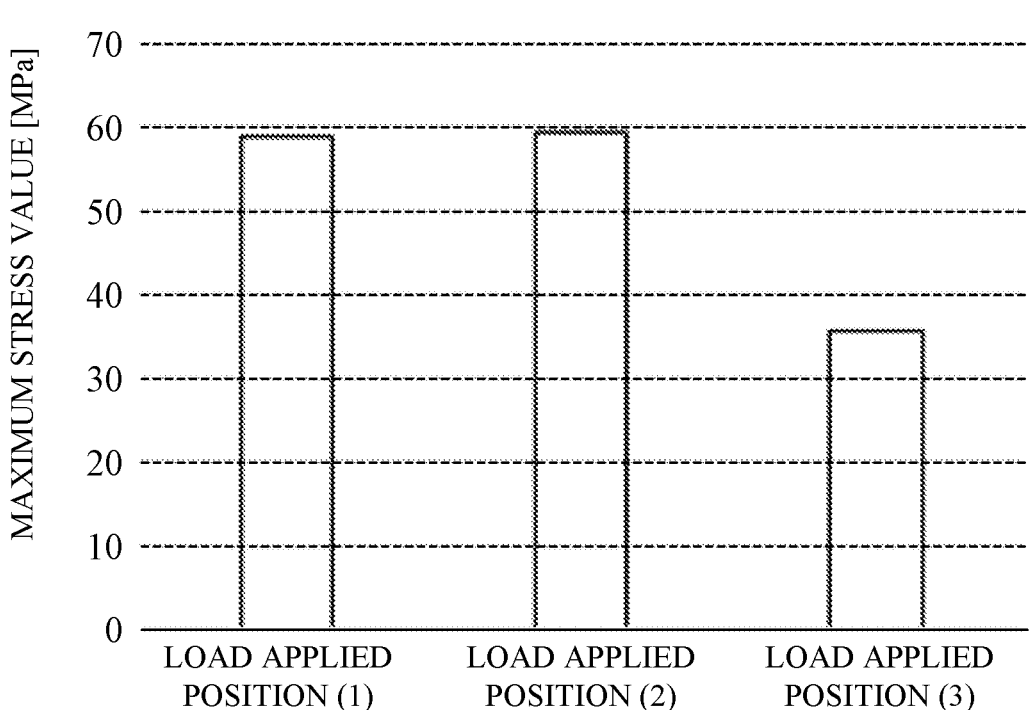
FIG. 8
PRIOR ART                              PRIOR ART
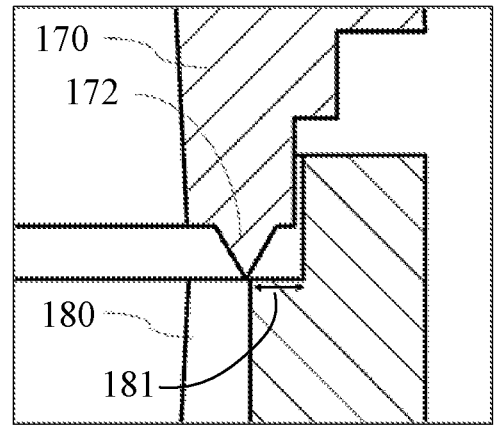
FIG. 9A                              FIG. 9B

MANUFACTURING METHOD OF HOUSING AND APPARATUS HAVING THE SAME

BACKGROUND

Technical Field

One of the aspects of the embodiments relates to a manufacturing method of a housing joined by ultrasonic welding.

Description of Related Art

The conventionally proposed ultrasonic welding technology welds and joins a plurality of members by inducing frictional heat on the joining surface using ultrasonic vibrations. Japanese Patent Laid-Open No. 2010-23272 discloses a method of welding two members along a joining surface having ribs whose heights change in the length direction.

In the method disclosed in Japanese Patent Laid-Open No. 2010-23272, the welding strength of a highly rigid portion due to its shape such as a corner of a joined body of two members may be higher than the welding strength in another portion. In this case, in the highly rigid portion, energy and working time more than necessary are likely to be used to melt the ribs.

SUMMARY

A manufacturing method according to one aspect of the disclosure of a housing that includes a first case having a first surface, a second case having a second surface opposite to the first surface, and ribs provided between the first case and the second case includes the steps of disposing the ribs on the first surface, and joining the first case and the second case together by melting the ribs. In the disposing step, in a case where a load in a first direction orthogonal to an applied surface including a joined surface between the first case and the second case of the housing is applied to the applied surface, a volume of each rib is set so that maximum values of stresses generated in a plurality of regions having the same area of the ribs fall within in a range from a value of 80% of a yield stress value of a material of the ribs to the yield stress value. Alternatively, in the disposing step, a volume of each rib is set so that a volume of the rib provided on the first surface per unit area in a first region is smaller than in a second region where the housing has rigidity higher than that of the first region. A manufacturing method of an apparatus having the above housing utilizing the above manufacturing method of the housing also constitutes another aspect of the disclosure.

Further features of various embodiments of the disclosure will become apparent from the following description of embodiments with reference to the attached drawings.

BRIEF DESCRIPTION OF THE DRAWINGS

FIG. 4 illustrates the maximum stress value generated in the welded rib in this embodiment.

FIGS. 5A and 5B explain the shape of the welded rib in this embodiment.

FIG. 8 illustrates the maximum stress value generated in the welded rib in the prior art.

FIGS. 9A and 9B explain the shape of the welded rib in the prior art.

DESCRIPTION OF THE EMBODIMENTS

Figure 1:
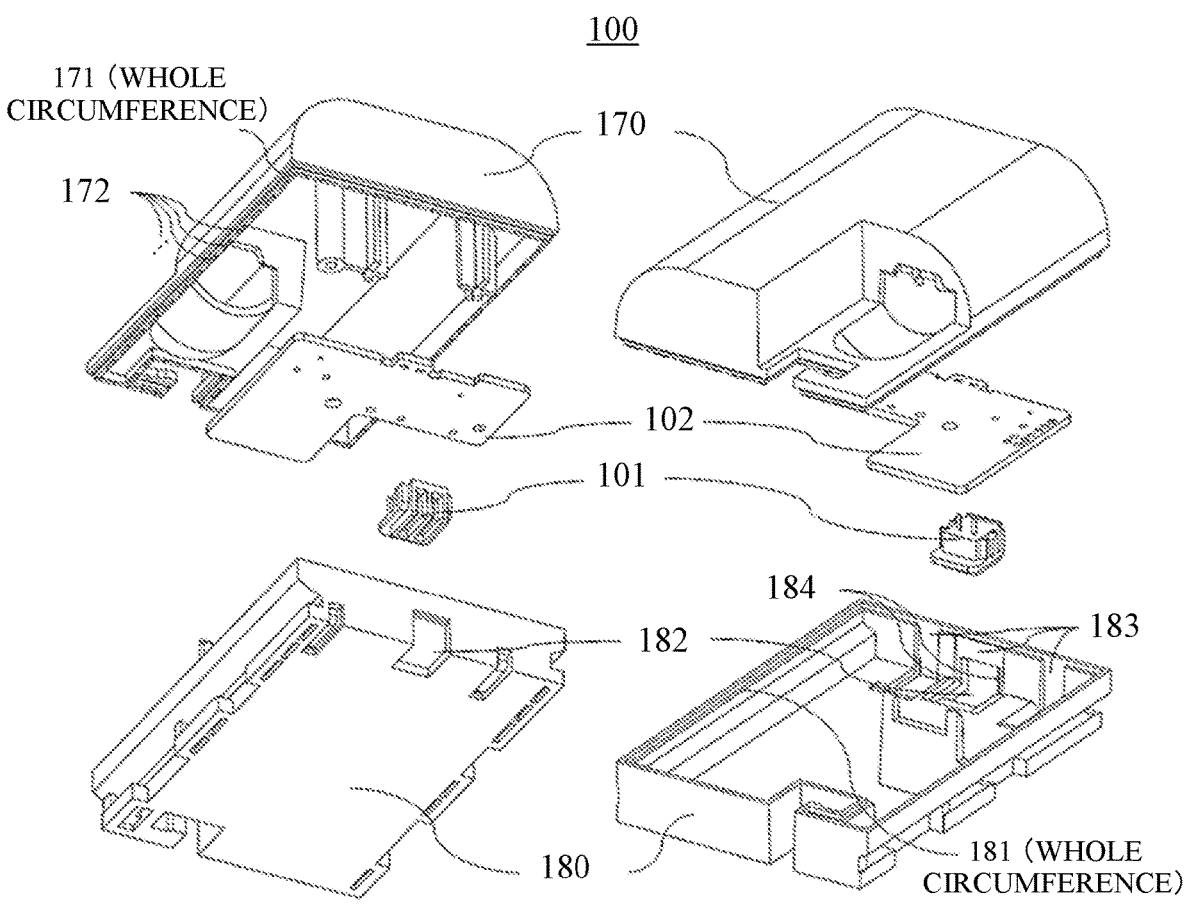
FIG. 1 is an exploded perspective view of a power supply connector device as an example apparatus according to this embodiment.

Referring now to the accompanying drawings, a detailed description will be given of embodiments according to the disclosure. Corresponding elements in respective figures will be designated by the same reference numerals, and a duplicate description thereof will be omitted.

FIG. 1 is an exploded perspective view of a coupler 100 as an example apparatus according to this embodiment. The coupler 100 is, for example, a power supply connector device that is used to drive an image pickup apparatus with a household power supply.

The coupler 100 includes a connector 101, a substrate 102, a first case 170, and a second case 180. The connector 101 is electrically connectable to an externally connected device. The first case 170 and the second case 180 are made of resin. Although the coupler 100 includes the connector 101 and substrate 102 as internal components in this embodiment, it may include other members.

In manufacturing the coupler 100, the first case 170 and the second case 180 are joined together by ultrasonic welding to form an integrated joined body (housing). In this embodiment, the joined body has a rectangular parallelepiped shape.

The ultrasonic welding technology welds and joins a plurality of members by inducing frictional heat on a joining surface using ultrasonic vibrations. In a case where the plurality of members using the ultrasonic welding technology are joined together, an ultrasonic vibrator that vibrates a welding horn tip is brought into pressure contact with the object to be welded by a compressive driving mechanism via a booster connected to the ultrasonic vibrator to oscillate ultrasonic waves for a predetermined period. The ultrasonic vibration energy is concentrated on the tip portion of the welded rib provided at the interface of one member. Thereby, the resin is melted and diffused by the frictional heat generated between the welded rib and its opposing surface, and a joined body can be obtained in which the two members are integrated.

The first case 170 has a welded rib arrangement surface (first surface) 171, which is an outer peripheral surface opposite to the second case 180 (a welded rib receiving surface 181 described below). Welded ribs 172 are continuously arranged on the welded rib arrangement surface 171 along the extending direction of the welded rib arrangement surface 171. The second case 180 is an outer peripheral surface opposite to the first case 170 (welded rib arrangement surface 171), and has a welded rib receiving surface (second surface) 181 with which the tips of the welded ribs 172 come into contact. The welding horn is brought into contact with the first case 170 or the second case 180 while the welded ribs 172 and the welded rib receiving surface 181 contact each other. Frictional heat is generated by applying ultrasonic vibration while the welding horn is pressed in the opposing direction of the first case 170 and the second case 180. Thereby, the welded ribs 172 are melted, and the first case 170 and the second case 180 are joined together.

An opening 182 is formed in the second case 180. The connector 101 is provided so as to be exposed to the outside through the opening 182. The opening 182 may be provided to allow a connector that is electrically connectable to the coupler 100 to be inserted from the outside. The opening 182 may be provided in the first case 170. Since the rigidity decreases around the opening 182, reinforcing ribs 184 may be provided at both ends of the opening 182.

The second case 180 includes thin portions 183 for suppressing interference with the connector 101 and the substrate 102. The thin portion 183 is configured such that its thickness (size in the thickness direction) is less than 50% of the thickness of another portion (basic portion) of the welded rib receiving surface 181.

A description will now be given of a case where a predetermined load in a direction orthogonal to a side surface (first direction) of the joined body (an applied surface including the joined portion between the first case 170 and the second case 180) is applied to any of a plurality of regions each having the same area on the side surface. "The same area" does not have to be strictly the same area but may be substantially the same area (approximately the same area). The predetermined load is a load that does not cause damage to the joined body, and can be arbitrarily set.

Figure 6:
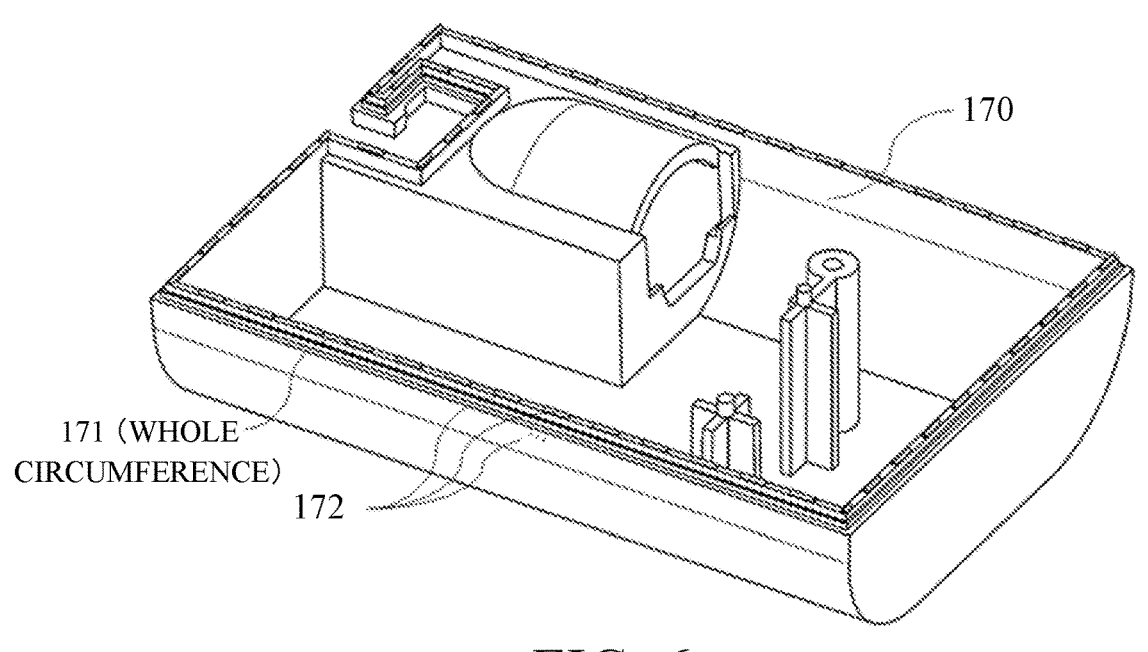
FIG. 6 is a perspective view of a first case in prior art.
Figure 7:
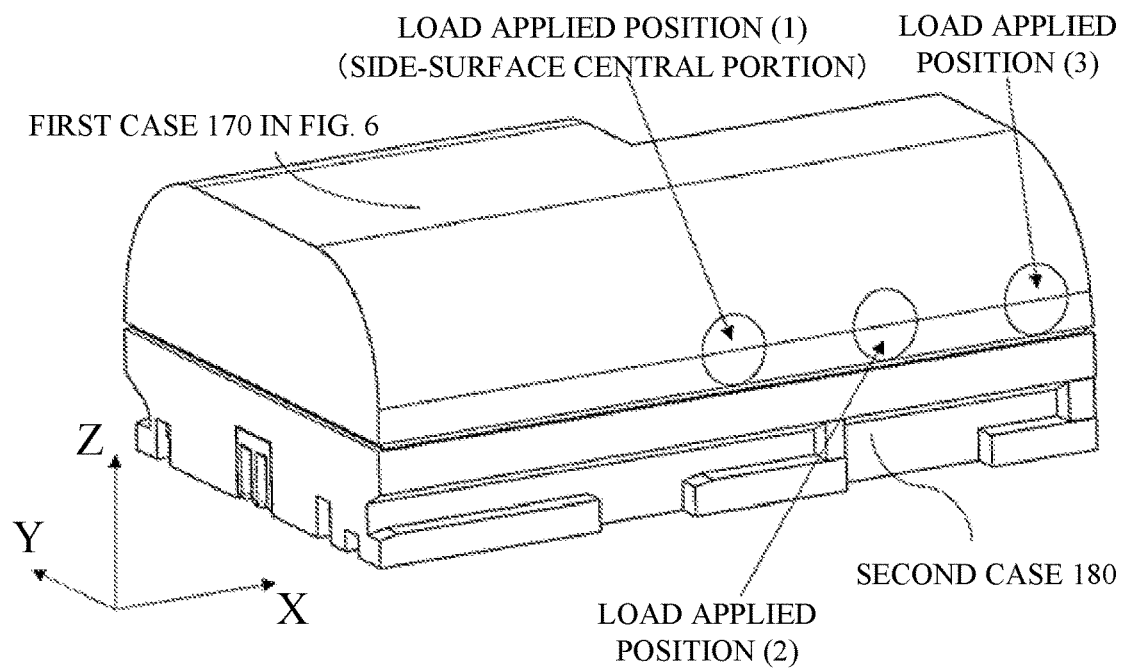
FIG. 7 illustrates positions where predetermined loads are applied in the prior art.

Referring now to FIGS. 6 to 8, a description will be given of the conventional art method of arranging welded ribs 172 on welded rib arrangement surface 171.

FIG. 6 is a perspective view of the first case 170. In FIG. 6, the welded ribs 172 are provided at a constant ratio of the welded rib arrangement surface 171 (ratio to the welded rib arrangement surface 171) regardless of their position on the welded rib arrangement surface 171.

FIG. 7 illustrates load applied positions (regions) where predetermined loads are applied on the side surface of the joined body in which the first case 170 and the second case 180 in FIG. 7 are joined together by ultrasonic welding. Load applied positions (1) and (3) are a central portion of the side surface of the joined body and the vicinity of a corner (or end) of the side surface of the joined body, respectively. The load applied position (2) is a position between load applied positions (1) and (3) in a direction (third direction) orthogonal to the side surface and the direction (second direction) in which the first case 170 and the second case 180 are joined together. In FIG. 7, a load of 2.5 kgf is set to the predetermined load. In a case where the predetermined load is applied to each position, deflection occurs in the first case 170 and the second case 180, and stress is generated in the welded rib 172.

FIG. 8 illustrates the maximum stress value generated in the region of the welded rib 172 closest to each position in a case where the predetermined load is applied to each of the load applied positions (1) to (3) in FIG. 7, which is calculated by stress analysis. As illustrated in FIG. 8, the maximum stress value generated in the region of the welded rib 172 closest to the load applied position (3) is approximately 60% of the maximum stress value generated in the region of the welded rib 172 closest to the load applied position (1). That is, the difference in the maximum stress value between the region of the welded rib 172 closest to the load applied position (1) and the region of the welded rib 172 closest to the load applied position (3) is large.

In designing the first case 170, a ratio of the welded ribs 172 to the welded rib arrangement surface 171 is to be set so that the welded ribs 172 are not get damaged in a case where the predetermined load is applied to the central portion of the side surface of the joined body, where the maximum stress value generated in the welded ribs 172 is greatest. That is, the vicinity of the corner where the maximum stress value generated in the welded rib 172 is smaller than that at the central portion of the side surface of the joined body has welding strength more than necessary. Since the welding strength can be secured as the welded ribs 172 are more closely arranged, the welded ribs 172 are arranged more densely than necessary near the corner of the side surface. As a result, ultrasonic vibration energy and working time are used to melt the welded ribs 172 more than necessary.

Accordingly, this embodiment sets the ratio of the welded ribs 172 to the welded rib arrangement surface 171 (volume of the welded ribs 172 provided per unit area) for each position of the welded rib 172 on the welded rib arrangement surface 171.

Figure 2:
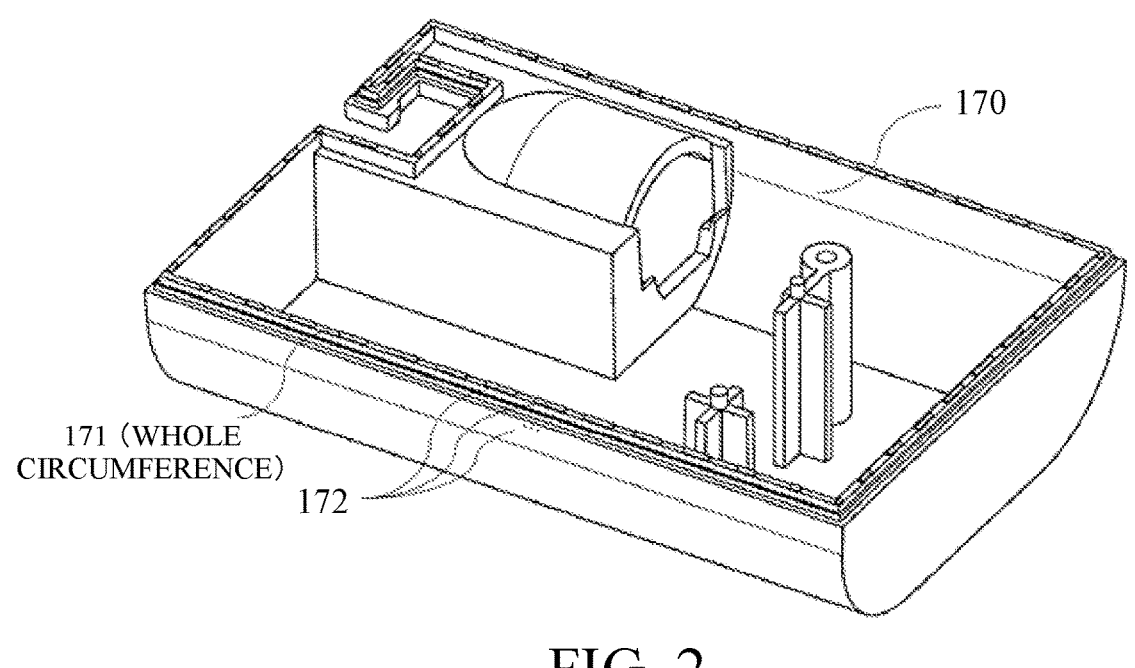
FIG. 2 is a perspective view of a first case according to this embodiment.
Figure 3:
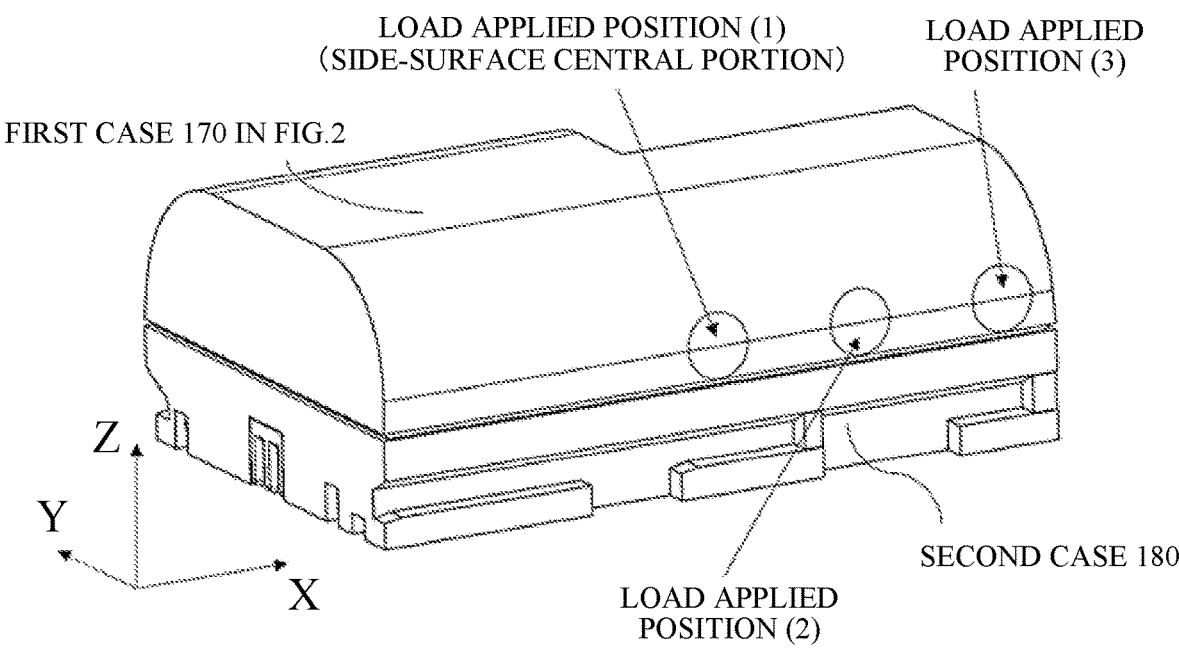
FIG. 3 illustrates positions where predetermined loads are applied in this embodiment.

Referring now to FIGS. 2 to 4, a description will be given of a method of arranging the welded ribs 172 on the welded rib arrangement surface 171 according to this embodiment.

FIG. 2 is a perspective view of the first case 170 in a case where the ratio of the welded ribs 172 to the welded rib arrangement surface 171 is changed according to the position of each welded rib 172 on the welded rib arrangement surface 171. This embodiment sets the ratio of the welded ribs 172 to the welded rib arrangement surface 171 such that the maximum stress values generated in a plurality of regions of the welded ribs 172 can fall within a predetermined range in a case where a predetermined load is applied to the side surface of the joined body in the direction orthogonal to the side surface. The predetermined range is set based on the yield stress value of the material of the welded rib 172. For example, the range from 80% of the yield stress value of the material of the welded rib 172 to the yield stress value may be set as the predetermined range. The predetermined range may be set to a range from 85% of the yield stress value of the material of the welded rib 172 to the yield stress value, or a range from 90% of the yield stress value of the material of the welded rib 172 to the yield stress value.

In this embodiment, as illustrated in FIG. 2, the welded ribs 172 are provided so that their ratio to the welded rib arrangement surface 171 decreases as they approach the corner of the welded rib arrangement surface 171 (as the rigidity becomes higher). That is, the volume of the welded rib 172 provided near the end of the welded rib arrangement surface 171 in the direction orthogonal to the side surface and the direction in which the first case 170 and the second case 180 are joined together is smaller than the volume of the welded rib 172 provided at the central portion.

FIG. 3 illustrates load applied positions (regions) where the predetermined loads are applied on the side surface of a joined body in which the first case 170 and the second case 180 of FIG. 2 are joined together by ultrasonic welding. The load applied positions (1) to (3) are the same as the load applied positions (1) to (3) in FIG. 7, respectively. In FIG. 3, a load of 2.5 kgf is set as the predetermined load. In a case where the predetermined load is applied to each position, deflection occurs in the first case 170 and the second case 180, and stress is generated in the welded rib 172.

FIG. 4 illustrates the maximum stress value generated in the region of the welded rib 172 closest to each position when the predetermined load is applied to the load applied positions (1) to (3) in FIG. 3, which is calculated by stress analysis. As illustrated in FIG. 4, the maximum stress value generated in the region of the welded rib 172 closest to the load applied position (3) is approximately 90% of the maximum stress value generated in the region of the welded rib 172 closest to the load applied position (1). That is, the difference in the maximum stress value between the region of the welded rib 172 closest to the load applied position (1) and the region of the welded rib 172 closest to the load applied position (3) is much smaller than the difference in the case of FIGS. 9A and 9B.

As described above, this embodiment changes the ratio of the welded ribs 172 to the welded rib arrangement surface 171 according to the position of each welded rib 172 on the welded rib arrangement surface 171. Thereby, in a case where a predetermined load is applied to the side surface of the joined body, the difference in the maximum stress value among the plurality of positions (regions) of the welded ribs 172 becomes smaller than the predetermined value. More specifically, in a case where the plurality of regions include a first position (first region) and a second position (second region) different from the first position, the difference between the maximum value (first maximum value) of the stress at the first position and the maximum value of the stress generated at the second position is smaller than the predetermined value. The smaller one of the first maximum value and the second maximum value is 80% or more of the larger one of the first maximum value and the second maximum value m. The smaller one of the first maximum value and the second maximum value may be 90% or more of the larger one of the first maximum value and the second maximum value. The first position (first region) is a position (region) among the welded ribs 172 closest to the central portion on the side surface of the joined body in the direction orthogonal to the side surface and the direction in which the first case 170 and the second case 180 are joined together. The second position (second region) is a position (region) among the welded ribs 172 closest to the end on the side surface of the joined body in the direction orthogonal to the side surface and the direction in which the first case 170 and the second case 180 are joined together.

The method for evaluating the maximum stress value after the ultrasonic welding of the first case 170 and the second case 180 is not limited to a specific method, and may use various methods.

As explained above, the configuration according to this embodiment can suppress the generation of welded ribs 172 having welding strength more than necessary, and thereby suppress the energy of ultrasonic vibration and the work time required to melt the welded ribs 172.

Near the opening 182, the rigidity of the second case 180 decreases and is likely to deflect. Therefore, in a case where a predetermined load is applied to the side surface of the joined body in a direction orthogonal to the side surface, the maximum stress generated in the welded rib 172 provided near the opening 182 increases. Accordingly, this embodiment makes the ratio of the welded rib 172 provided near the opening 182 to the welded rib arrangement surface 171 larger than the ratio of the welded rib 172 to the welded rib arrangement surface 171 in a case where the opening 182 is not provided. Thereby, the welding strength of the welded rib 172 provided near the opening 182 can be secured. In order to avoid stress concentration at the end of the opening 182, the end of the welded rib 172 provided near the opening 182 in the long side direction (in the Y direction in this embodiment) may be disposed outside (on the +Y or −Y direction side of) the end of the opening 182 in the long side direction of the opening 182.

A description will now be given of the shape of the welded rib 172 in the thin portion 183. In order to stably melt the welded ribs 172, the welded ribs 172 may contact the central portion of the welded rib receiving surface 181 during ultrasonic welding. Assume that the central portion includes substantially the central portion (approximately the central portion, the vicinity of the central portion).

FIGS. 9A and 9B explain the shape of conventional welded ribs 172. FIG. 9A is a perspective view of the welded ribs 172 and the thin portion 183 when viewed from inside coupler 100. FIG. 9B is a sectional view of the welded rib 172. As described above, the thin portion 183 is configured such that its thickness is less than 50% of the thickness of another portion of the welded rib receiving surface 181. Therefore, as illustrated in FIGS. 9A and 9B, the welded rib 172 does not contact the welded rib receiving surface 181 in the thin portion 183, and may not be properly melted.

Accordingly, this embodiment provides the welded ribs 172 so that the welded ribs 172 contact the central portion of the welded rib receiving surface 181 in the thin portion 183 in the short side direction. FIGS. 5A and 5B explain the shape of the welded rib 172 according to this embodiment.

For example, as illustrated in FIG. 5A, the welded rib 172 includes a first slope 173 provided on the inner side of the coupler 100 and a second slope 174 provided on the outer side of the coupler 100. The interior angle of the welded rib 172 forming the first slope 173 is smaller than the interior angle of the welded rib 172 forming the second slope 174.

As illustrated in FIG. 5B, the welded rib 172 may have a rectangular sectional shape. At this time, the welded rib 172 includes a first vertical surface 175 provided perpendicularly to the welded rib arrangement surface 171 and on the inner side of the coupler 100, and a second vertical surface 176 provided perpendicularly to the welded rib arrangement surface 171 and on the outer side of the coupler 100. In order for the welded rib 172 to contact the central portion of the welded rib receiving surface 181 in the thin portion 183, the first vertical surface 175 is provided closer to the outer side of the coupler 100. That is, in the short side direction of the welded rib receiving surface 181, the first vertical surface 175 is located closer to the central portion of the welded rib arrangement surface 171 than the second vertical surface 176.

Each welded rib 172 may have a sectional shape of another shape such as a trapezoid, as long as it can contact the central portion of the welded rib receiving surface 181 in the thin portion 183.

As described above, since the welded rib 172 has a shape that enables the welded rib 172 can contact the welded rib receiving surface 181 in the thin portion 183, the welded rib 172 can be stably melted.

This embodiment makes the ratio of the welded ribs 172 that contact the welded rib receiving surface 181 in the thin portions 183 to the welded rib arrangement surface 171 larger than that that in the case where the welded ribs 172 in the thin portions 183 do not contact the welded rib receiving surface 181. Thereby, the welding strength of the welded ribs 172 can be secured. In order to avoid stress concentration on the ends of the thin portions 183, the ends of the welded ribs 172 in the long side direction (in the Y direction in this embodiment) may be disposed outside (on the +Y or −Y direction side) the ends of the thin portions 183 in the long side direction.

While the disclosure has described example embodiments, it is to be understood that some embodiments are not limited to the disclosed embodiments. The scope of the following claims is to be accorded the broadest interpretation so as to encompass all such modifications and equivalent structures and functions.

This embodiment provides a manufacturing method of a housing that includes a first case having a first surface, a second case having a second surface opposite to the first surface, and ribs between the first case and the second case. The manufacturing method includes the steps of disposing the ribs on the first surface, and joining the first case and the second case together by melting the ribs using, for example, ultrasonic welding. In the disposing step, in a case where a load in a first direction orthogonal to an applied surface including a joined surface between the first case and the second case of the housing is applied to the applied surface, a volume of each rib is set so that maximum values of stresses generated in a plurality of regions having the same area of the ribs fall within in a range from a value of 80% of a yield stress value of a material of the ribs to the yield stress value. In other words, in the disposing step, a volume of each rib is set so that a volume of the rib provided on the first surface per unit area in a first region is smaller than in a second region where the housing has rigidity higher than that of the first region.

This embodiment can manufacture a housing that can suppress energy and work time during ultrasonic welding while securing welding strength.

This application claims priority to Japanese Patent Application No. 2023-067104, which was filed on Apr. 17, 2023, and which is hereby incorporated by reference herein in its entirety.

What is claimed is:

1. A manufacturing method of a housing that includes a first case having a first surface, a second case having a second surface opposite to the first surface, and ribs provided between the first case and the second case, the manufacturing method comprising the steps of:

disposing the ribs on the first surface; and joining the first case and the second case together by melting the ribs, wherein in the disposing step, where a load in a first direction orthogonal to an applied surface including a joined surface between the first case and the second case of the housing is applied to the applied surface, a volume of each rib is set so that maximum values of stresses generated in a plurality of regions having the same area of the ribs fall within in a range from a value of 80% of a yield stress value of a material of the ribs to the yield stress value.

2. The manufacturing method according to claim 1, wherein the plurality of regions of the ribs include, on the applied surface, a first region that is closest to a central portion in a direction orthogonal to the first direction and a second direction in which the first case and the second case are joined together, and a second region that is closest to vicinity of an end in the direction orthogonal to the first and second directions, and wherein the volume of the rib in the second region is smaller than the volume of the rib in the first region.

3. The manufacturing method according to claim 1, wherein the plurality of regions include a first region and a second region different from the first region, and wherein in a case where the load in the first direction is applied to the applied surface, a smaller one of a first maximum value of stress generated in the first region and a second maximum value of stress generated in the second region is 80% or more of a larger one of the first maximum value and the second maximum value.

4. The manufacturing method according to claim 3, wherein the first region is closest to a central portion in a direction orthogonal to the first direction and a second direction in which the first case and the second case are joined together, and wherein the second region is closest to vicinity of an end of the applied surface in the direction orthogonal to the first and second directions.

5. The manufacturing method according to claim 1, wherein one of the first case and the second case has an opening, and wherein the one of the first case and the second case has reinforcing ribs at both end portions of the opening.

6. The manufacturing method according to claim 1, wherein the second case includes a thin portion thinner than another part of the second case, and wherein in the disposing step, the rib contacts a central portion of the second surface of the thin portion in a short side direction.

7. The manufacturing method according to claim 6, wherein in the disposing step, the rib that contacts the central portion of the second surface in the short side direction has a first slope provided on an inner side of the housing and a second slope provided on an outer side of the housing, and wherein an interior angle forming the first slope is smaller than an interior angle forming the second slope.

8. The manufacturing method according to claim 6, wherein in the disposing step, the rib that contacts the central portion of the second surface in the short side direction includes a first vertical surface provided perpendicularly to the first surface, and a second vertical surface provided perpendicularly to the first surface and on an outer side of the first vertical surface in the housing, and wherein in the short side direction, the first vertical surface is disposed closer to the central portion of the first surface than the second vertical surface.

9. The manufacturing method according to claim 1, wherein each of the first case and the second case is made of resin.

10. The manufacturing method according to claim 1, wherein the ribs are provided along an extending direction of the first surface.

11. A manufacturing method of a housing that includes a first case having a first surface, a second case having a second surface opposite to the first surface, and ribs provided between the first case and the second case, the manufacturing method comprising the steps of:

disposing the ribs on the first surface; and joining the first case and the second case together by melting the ribs, wherein in the disposing step, a volume of each rib is set so that a volume of each rib provided on the first surface per unit area in a first region is smaller than in a second region where the housing has rigidity higher than that of the first region.

12. A manufacturing method of an apparatus that includes a housing and a component provided inside the housing, the housing including a first case having a first surface, a second case having a second surface opposite to the first surface, and ribs provided between the first case and the second case, the manufacturing method comprising the step of manufacturing the housing using the manufacturing method according to claim 1.

13. A manufacturing method of an apparatus that includes a housing and a component provided inside the housing, the housing including a first case having a first surface, a second case having a second surface opposite to the first surface, and ribs provided between the first case and the second case, the manufacturing method comprising the step of manufacturing the housing using the manufacturing method according to claim 11.

14. The apparatus according to claim 12, wherein the apparatus is a power supply connector device.

15. The apparatus according to claim 13, wherein the apparatus is a power supply connector device.

* * * * *